July 15, 1958 W. A. RAY 2,843,648

THERMOELECTRIC GENERATOR

Filed Oct. 17, 1955

Inventor,
WILLIAM A. RAY

By John H. Rouse,
Attorney 2,843,648
Patented July 15, 1958

2,843,648

THERMOELECTRIC GENERATOR

William A. Ray, North Hollywood, Calif., assignor to General Controls Co., Glendale, Calif., a corporation of California Application October 17, 1955, Serial No. 540,846
6 Claims. (Cl. 136—4)

My present invention relates to thermoelectric generators of the type adapted to be heated by electricity from a conventional source of alternating or direct current and thereby to produce thermoelectric current for the operation of sensitive electrical apparatus.

In some control systems it is desirable that the generation and cessation of the thermoelectric current should closely follow the energization and deenergization of the electric heater. It is therefore a main object of this invention to provide a thermoelectric generator of the character described which is not only relatively efficient in operation but also responds promptly to the turning on and off of the heater.

Another object of the invention is to provide, in a thermoelectric generator of the character described, a thermocouple which, while fast-acting, has relatively low electrical resistance.

For full understanding of the invention, and further appreciation of its features and advantages, reference is to be had to the following detailed description and accompanying drawing, and to the appended claims.

In the drawing:

Fig. 5 being rotated through 90° relative to Fig. 1.

Figure 1:
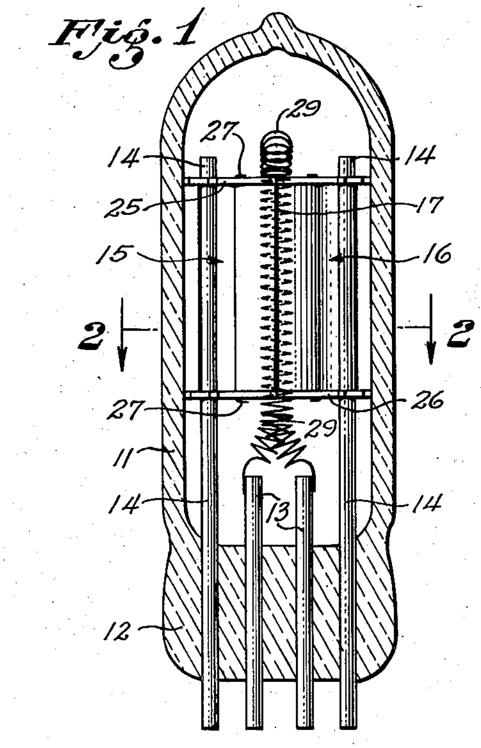
Figure 1 is a view, in longitudinal section, of a thermoelectric generator embodying this invention.
Figure 2:
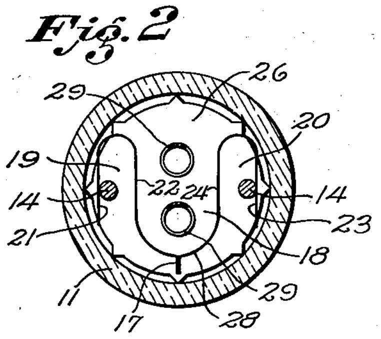
Figure 2 is a transverse section taken along the line 2—2 of Fig. 1.
Figure 3:
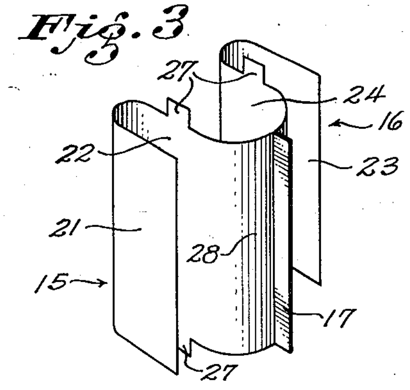
Figure 3 is a perspective view of the thermocouple, per se, of the generator shown in Figs. 1 and 2.

Referring first more particularly to Figs. 1–3 of the drawing, the numeral 11 indicates a sealed glass envelope having a thick base-portion 12 the material of which is molded around medial portions of a pair of short wires or pins 13 and a pair of relatively long wires 14.

Within the envelope and secured to wires 14, as by welding, is a thermocouple (shown per se in Fig. 3) which consists of a pair of thin sheets 15 and 16 of thermoelectrically dissimilar metals such as the well-known alloys "Chromel" and "Copel." A narrow marginal portion of each sheet has been bent-up and welded to the other, as indicated at 17, to form the hot-junction of the thermocouple. The sheets have then been bent to provide a central trough 18, U-shaped in cross section, and rebent to provide similar, but inverted, side troughs 19 and 20 (see Fig. 2) defined in part by flat parallel portions 21 and 22 of sheet 15 and like portions 23 and 24 of sheet 16.

Additional support for the thermocouple is provided by a pair of disks 25 and 26, abutting the thermocouple, of heat-resistant insulating material such as mica, these disks being of the conventional type having serrations adapted to grip the side wall of the glass envelope. The side portions 22, 24 of the thermocouple are provided at their opposite ends with tongues 27 which are received in slots in the mica disks and are then bent-over as shown in Fig. 1.

For heating the linear hot-junction 17 in the crook portion 28 of the U-shaped central trough 18, there is a coiled wire or filament 29 of elongated U-shape which passes through conforming openings in the mica disks and is thus supported, the ends of the heating element or filament being welded to the inner ends of base-pins 13. The heating element is of fine wire so that it heats quickly when energized by a source of electric current connected to the outer ends of pins 13, and likewise cools quickly when the energizing current is interrupted.

The sheet metal of which the thermocouple is constructed is very thin—its thickness being 0.002 inch in an actual embodiment of the invention substantially as shown in Figs. 1–3 and wherein the height of the thermocouple is 0.625 inch. Known alloys, such as "Chromel" and "Copel," capable of producing high thermal E. M. F. and of withstanding high temperature, have relatively high resistivity. But by making the sheets relatively wide along their junction edges, the resistance of the thermocouple when constructed of such alloys is sufficiently low that the thermocouple can be employed to energize an ordinary sensitive relay connected to the outer ends of wires 14. It is to be observed that the cross sectional area of the sheets as described above (0.002 x 0.625 inch) is about the same as that of a No. 18 A. W. G. wire. In the thermocouple shown in Figs. 1–3 each of the sheets 15 and 16 is approximately square as measured from junction 17 to wire 14.

By providing a heating element long enough to heat the whole extent of junction 17 uniformly, full generation of the E. M. F. occurs almost instantly. And because of the relatively-high thermal conductivity and large radiating surface of the thermocouple, the temperatures throughout the thermocouple are quickly equalized when the heating is interrupted; radiation of heat from the hotter sides 22, 24 of the thermocouple toward its cooler sides 21, 23 contributing to this effect.

The cold-junction of the thermocouple is, effectively, at the junction between the thermocouple and wires 14, which junctions are shielded by the sides 22, 24 of the thermocouple from the heat produced by element 29. Since the rods 14 extend the full height of the thermocouple they are very effective in conducting heat away from the cold-junction to the exterior of the generator. The one of the rods 14 joined to the "Chromel" sheet is preferably of copper or brass since these metals have high thermal and electrical conductivity and are, thermoelectrically, somewhat similar to "Chromel." The other of the rods 14, joined to the "Copel" sheet, may be of that alloy since its thermal and electrical resistivity is not excessive. The protective glass envelope 11 may be evacuated or filled with an inert gas.

Figure 4:
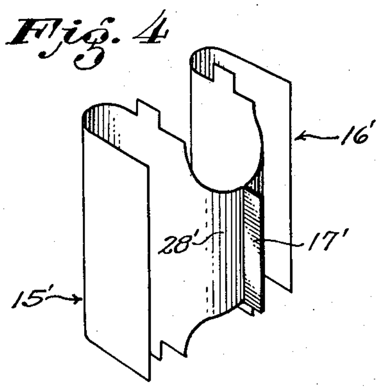
Figure 4 is a view, similar to that of Fig. 3, of a modified form of thermocouple according to the invention.

The modified form of thermocouple shown in Fig. 4 is the same as the thermocouple of Fig. 3 except that the crook portion 28' of the modified thermocouple has been reduced in length at and adjoining its hot-junction 17'. Because of the smaller mass of the shorter hot-junction 17' it will reach a somewhat higher temperature when subjected to heat in the same manner as in the arrangement of Fig. 1. And when the heating is interrupted, the temperatures throughout the thermocouple are quickly equalized as described in connection with the thermocouple of Fig. 3 since the thermal conduction and radiating surfaces of both thermocouples are not significantly different.

Figure 5:
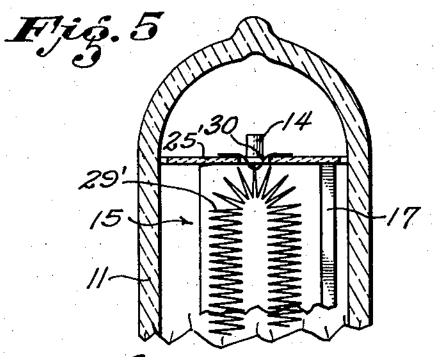
Figure 5 is a fragmentary sectional view of a thermoelectric generator similar to that of Figs. 1–2 but employing a modified support for the electric heater.

The structure shown in Fig. 5 is the same as that of Fig. 1 except in regard to the heating element of filament 29' which is somewhat shorter than the filament 29 of Fig. 1 since it extends only to the underside of the upper mica-disk 25' and is supported at its top by a wire hook 30 projecting through a central opening in the mica disk. By this arrangement more efficient utilization of the heating element is accomplished. It is to be observed that the showing of Fig. 5 is rotated through 90° relative to that of Fig. 1.

Figure 6:
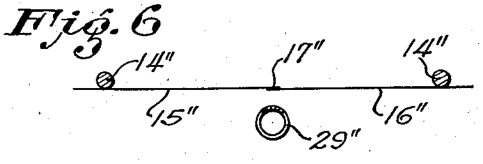
Figure 6 is a sectional view of a modified form of thermoelectric generator according to the invention.

Figure 6 illustrates an elementary form of thermoelectric generator according to this invention and wherein the parts corresponding to those in Figs. 1–3 have been assigned the same numerals but with a double-prime mark added. Each of the thermocouple sheets 15'' and 16'' may be approximately square so that the hot-junction 17'' is of substantial length. In this arrangement the heating element 29'' is preferably in the form of a straight coiled-filament extending adjacent the hot-junction and supported at its opposite ends. To make this generator more compact, the thermocouple may be bent to form a single trough similar to that indicated at 18 in Fig. 2.

The specific embodiments of my invention herein shown and described are obviously susceptible of modification without departing from the spirit of the invention, and I intend therefore to be limited only by the scope of the appended claims.

I claim as my invention:

1. A thermoelectric generator comprising a thermocouple consisting of a pair of thin sheets of thermoelectrically dissimilar metals joined together at one of their respective edges and bent to form an elongated main trough, the side walls of said main trough being rebent to form an additional trough at each side of the main trough and inverted relative thereto, each of said troughs being relatively deep and generally U-shaped in cross section, the side walls of the troughs being generally parallel to each other; the junction of said sheets being linear, substantially central of the crook of said main trough, and parallel to the general axis of the main trough; means for heating said junction comprising an elongated electric heating element mounted in said main trough adjacent the junction, said element being substantially parallel to the junction and in spaced relation to the main trough; and means connected to the outer side walls of said additional troughs for connecting the thermocouple in an electric circuit.

2. A thermoelectric generator according to claim 1 wherein said heating element is at least as long as said junction.

3. A thermoelectric generator according to claim 1 wherein the portion of said main trough at and adjoining said junction is reduced in length to effect reduction of the mass of said portion.

4. A thermoelectric generator according to claim 1 wherein each of said sheets is approximately square, and of equal size, before bending.

5. A thermoelectric generator according to claim 1 and including a vitreous envelope sealingly encompassing the thermocouple and the heating element.

6. A thermoelectric generator according to claim 1 wherein the inner surface of said main trough is smoothly U-shaped in cross section.

References Cited in the file of this patent

UNITED STATES PATENTS

| | | |
|---|---|---|
| 1,495,795 | Pierce | May 27, 1924 |
| 2,525,439 | Abbott | Oct. 10, 1950 |
| 2,639,305 | Wills | May 19, 1953 |
| 2,744,947 | Ray | May 8, 1956 |
| 2,745,053 | Meyer | May 8, 1956 |

FOREIGN PATENTS

| | | |
|---|---|---|
| 500,003 | Canada | Feb. 16, 1954 |